US012800916B2

(12) United States Patent
Maruyama et al.

(10) Patent No.: US 12,800,916 B2
(45) Date of Patent: Nov. 17, 2026

(54) OPTICAL SYSTEM

(71) Applicants: Kantatsu Co., Ltd, Tokyo (JP); Sharp Display Technology Corporation, Mie (JP)

(72) Inventors: Ryo Maruyama, Tokyo (JP); Naru Usukura, Mie (JP)

(73) Assignees: Kantatsu Co., Ltd, Tokyo (JP); Sharp Display Technology Corporation, Mie (JP)

( * ) Notice: Subject to any disclaimer, the term of this patent is extended or adjusted under 35 U.S.C. 154(b) by 216 days.

(21) Appl. No.: 18/641,419

(22) Filed: Apr. 21, 2024

(65) Prior Publication Data

US 2024/0402487 A1 Dec. 5, 2024

(30) Foreign Application Priority Data

Jun. 2, 2023 (JP) ................................ 2023-091935

(51) Int. Cl.
*G02B 27/00* (2006.01)
*G02B 25/00* (2006.01)

(52) U.S. Cl.
CPC ....... *G02B 27/0025* (2013.01); *G02B 25/007* (2013.01); *G02B 25/008* (2013.01)

(58) Field of Classification Search
CPC .............. G02B 27/0025; G02B 25/007; G02B 25/008; G02B 25/001; G02B 27/0172; G02B 13/0015; G02B 13/003; G02B 13/0055; G02B 13/0065; G02B 13/18; G02B 27/28
See application file for complete search history.

(56) References Cited

U.S. PATENT DOCUMENTS

2023/0341697 A1 * 10/2023 Chen ...................... G02B 27/28
2024/0310633 A1 * 9/2024 Hudman ............ G02B 27/0093

FOREIGN PATENT DOCUMENTS

JP 3441188 8/2003

* cited by examiner

*Primary Examiner* — Mariam Qureshi
(74) *Attorney, Agent, or Firm* — JCIPRNET

(57) ABSTRACT

An optical system includes, in order from the pupil plane side to the display plane side, a first reflective polarizing plate, a first lens having a convex surface on the pupil plane side, a half mirror, a second lens having a convex surface on the display plane side, a second reflective polarizing plate, a first ¼ wavelength plate, and a second ¼ wavelength plate. The optical system satisfies:

$$14 < r1/T1 < 250 \quad (1)$$

$$0.7 < (D2/f2)\times 100 < 5.0 \quad (2)$$

where r1 is the paraxial radius of curvature of a surface of the first lens on the pupil plane side, T1 is the distance on an optical axis from a surface of the first lens on the display plane side to a surface of the second lens on the pupil plane side, D2 is the thickness of the second lens L2 on the optical axis, and f2 is the focal length of the second lens.

6 Claims, 10 Drawing Sheets

Spherical aberration [mm] Astigmatism [mm] Distortion aberration [%]

OPTICAL SYSTEM

CROSS-REFERENCE TO RELATED APPLICATION

This application claims the priority benefits of Japanese application no. 2023-091935, filed on Jun. 2, 2023. The entirety of the above-mentioned patent application is hereby incorporated by reference herein and made a part of this specification.

BACKGROUND

Technical Field

The disclosure relates to an optical system that magnifies an image (for example, an image displayed on an image display element).

Description of Related Art

Electronic viewfinders, electronic binoculars, head-mounted displays, etc. are known as display devices using image display elements.

For such display devices, it is necessary to accommodate an optical system for magnifying the image displayed on the image display element within a limited space while minimizing the distance between the image display element and the eye. Therefore, it is usually difficult to remove various aberrations in the optical system, and the range of correction is also limited.

As well known, visual acuity depends on the cone density of photoreceptor cells, and the eye has the characteristics of forming a clear image near the fovea of the macular region, that is, the center of the pupil. Thus, by utilizing the physiological optical characteristics of the eye to supplement the aberration correction of the optical system, it is possible to obtain good optical performance. Specifically, by narrowing down the pupil, the depth of focus becomes deeper and the effects of spherical aberration and coma aberration are reduced, so the sensitivity to blur can be reduced even if there is excess or deficiency in the aberration or refraction correction. In addition, by utilizing the so-called Stiles-Crawford effect, a phenomenon in which the sensitivity to light entering from the periphery is lower than the sensitivity to light passing through the central portion of the pupil, the effects of spherical aberration, coma aberration, and chromatic aberration can be reduced. Furthermore, by maintaining this state, the eye may gradually get used to this state, so the effects of distortion aberration or the like can also be reduced.

The optical system installed in such display devices is required to be compact and have high light intensity efficiency. Here, the light intensity efficiency refers to the ratio of the amount of light that reaches the eye (pupil plane) when the amount of light on the display plane of the image display element is taken as 100%.

For example, the optical system described in Patent Document 1 (Japanese Patent No. 3441188) below is known as a conventional optical system. Patent Document 1 discloses an optical system including a partial optical system that has two semi-transmissive surfaces, and a refractive optical element that has power.

Even though there is an attempt to reduce the size and improve the light intensity efficiency with the optical system described in Patent Document 1, it is difficult to improve the light intensity efficiency due to the two semi-transmissive surfaces, and good optical performance cannot be obtained.

The disclosure provides an optical system that has high resolution with various aberrations properly corrected while satisfying the demands for miniaturization and improvement of light intensity efficiency in a well-balanced manner.

SUMMARY

An optical system according to the disclosure includes, in order from the pupil plane side to the display plane side, a first reflective polarizing plate, a first lens having positive refractive power, a half mirror, a second lens having positive refractive power, a second reflective polarizing plate, a first ¼ wavelength plate arranged between the pupil plane and the half mirror, and a second ¼ wavelength plate arranged between the half mirror and the display plane. The first lens has a convex surface on the pupil plane side at the paraxial position, and the second lens has a convex surface on the display plane side at the paraxial position. It should be noted that, in this specification, the convex, concave, and flat surfaces of a lens refer to the paraxial shape, and the refractive power refers to the paraxial refractive power unless otherwise specified.

The reflective polarizing plate reflects linearly polarized light having a certain polarization direction and transmits linearly polarized light having a polarization direction orthogonal thereto.

The ¼ wavelength plate delays the phase of polarized light by ¼λ, thereby converting linearly polarized light into circularly polarized light and circularly polarized light into linearly polarized light.

The first lens has positive refractive power and has a convex surface on the pupil plane side at the paraxial position, so that the first lens suppresses spherical aberration, astigmatism, field curvature, and distortion aberration.

The half mirror transmits 50% of the light and reflects the remaining 50%.

The second lens has positive refractive power and has a convex surface on the display plane side at the paraxial position, so that the second lens properly corrects spherical aberration, coma aberration, astigmatism, field curvature, and distortion aberration.

In the optical system of the disclosure, the first reflective polarizing plate, the first lens having positive refractive power, and the first ¼ wavelength plate constitute an element group on the pupil side; and the second ¼ wavelength plate, the second lens having positive refractive power, and the second reflective polarizing plate constitute an element group on the display plane side. Since the element group on the pupil side and the element group on the display plane side are arranged substantially symmetrically with respect to the semi-transmissive surface of the half mirror, by finally superimposing the two lights, the light reflected by the half mirror and the light transmitted through the half mirror, it is possible to reduce the size of the optical system and improve the light intensity efficiency.

It is desirable that the optical system having the above configuration satisfies the following conditional expression (1).

$$14 < r1/T1 < 250 \quad (1)$$

where r1 is the paraxial radius of curvature of the surface of the first lens on the pupil plane side, and T1 is the distance on the optical axis from the surface of the first lens on the display plane side to the surface of the second lens on the pupil plane side.

By satisfying the range of conditional expression (1), it is possible to properly correct spherical aberration, astigmatism, field curvature, and distortion aberration while achieving a reduction in height.

It is desirable that the optical system having the above configuration satisfies the following conditional expression (2).

$$0.7 < (D2/f2) \times 100 < 5.0 \tag{2}$$

where D2 is the thickness of the second lens on the optical axis, and f2 is the focal length of the second lens.

By satisfying the range of conditional expression (2), it is possible to properly correct spherical aberration, coma aberration, astigmatism, field curvature, and distortion aberration while achieving a reduction in height.

It is desirable that the optical system having the above configuration satisfies the following conditional expression (3).

$$55 < f2/hm2 < 3100 \tag{3}$$

where f2 is the focal length of the second lens, and hm2 is the distance on the optical axis from the surface of the half mirror on the display plane side to the surface of the second lens on the pupil plane side.

By satisfying the range of conditional expression (3), it is possible to properly correct spherical aberration, coma aberration, astigmatism, field curvature, and distortion aberration while achieving a reduction in height.

It is desirable that the optical system having the above configuration satisfies the following conditional expression (4).

$$3 < f2/f < 11 \tag{4}$$

where f2 is the focal length of the second lens, and f is the focal length of the entire optical system.

By satisfying the range of conditional expression (4), it is possible to properly correct spherical aberration, coma aberration, astigmatism, field curvature, and distortion aberration.

It is desirable that the optical system having the above configuration satisfies the following conditional expression (5).

$$10 < (f1 + f2)/f < 22 \tag{5}$$

where f1 is the focal length of the first lens, f2 is the focal length of the second lens, and f is the focal length of the entire optical system.

By satisfying the range of conditional expression (5), it is possible to properly correct spherical aberration, coma aberration, astigmatism, field curvature, and distortion aberration.

It is desirable that the optical system having the above configuration satisfies the following conditional expression (6).

$$0.25 < r1/f1 < 1.00 \tag{6}$$

where r1 is the paraxial radius of curvature of the surface of the first lens on the pupil plane side, and f1 is the focal length of the first lens.

By satisfying the range of conditional expression (6), it is possible to properly correct spherical aberration, astigmatism, field curvature, and distortion aberration.

It is desirable that the optical system having the above configuration satisfies the following conditional expression (7).

$$0.1 < r1/(f1 + f2) < 0.5 \tag{7}$$

where r1 is the paraxial radius of curvature of the surface of the first lens on the pupil plane side, f1 is the focal length of the first lens, and f2 is the focal length of the second lens.

By satisfying the range of conditional expression (7), it is possible to properly correct spherical aberration, coma aberration, astigmatism, field curvature, and distortion aberration.

It is desirable that the optical system having the above configuration satisfies the following conditional expression (8).

$$-1.00 < r4/f2 < -0.25 \tag{8}$$

where r4 is the paraxial radius of curvature of the surface of the second lens on the display plane side, and f2 is the focal length of the second lens.

By satisfying the range of conditional expression (8), it is possible to properly correct spherical aberration, coma aberration, astigmatism, field curvature, and distortion aberration.

It is desirable that the optical system having the above configuration satisfies the following conditional expression (9).

$$-3.50 < r4/f2 \times D2 < -0.85 \tag{9}$$

where r4 is the paraxial radius of curvature of the surface of the second lens on the display plane side, f2 is the focal length of the second lens, and D2 is the thickness of the second lens on the optical axis.

By satisfying the range of conditional expression (9), it is possible to properly correct spherical aberration, coma aberration, astigmatism, field curvature, and distortion aberration while achieving a reduction in height.

It is desirable that the optical system having the above configuration satisfies the following conditional expression (10).

$$41 < vd2 < 70 \tag{10}$$

where νd2 is the Abbe number of the second lens for the d-line.

By satisfying the range of conditional expression (10), it is possible to properly correct chromatic aberration.

It is desirable that the optical system having the above configuration satisfies the following conditional expression (11).

$$0.9 < (D1/f1) \times 100 < 4.0 \quad (11)$$

where D1 is the thickness of the first lens on the optical axis, and f1 is the focal length of the first lens.

By satisfying the range of conditional expression (11), it is possible to properly correct spherical aberration, astigmatism, field curvature, and distortion aberration while achieving a reduction in height.

It is desirable that the optical system having the above configuration satisfies the following conditional expression (12).

$$3 < f1/f < 11 \quad (12)$$

where f1 is the focal length of the first lens, and f is the focal length of the entire optical system.

By satisfying the range of conditional expression (12), it is possible to properly correct spherical aberration, astigmatism, field curvature, and distortion aberration.

It is desirable that the optical system having the above configuration satisfies the following conditional expression (13).

$$0.5 < f1/f2 < 1.5 \quad (13)$$

where f1 is the focal length of the first lens, and f2 is the focal length of the second lens.

By satisfying the range of conditional expression (13), it is possible to properly correct spherical aberration, coma aberration, astigmatism, field curvature, and distortion aberration.

It is desirable that the optical system having the above configuration satisfies the following conditional expression (14).

$$-1.5 < r1/r4 < -0.5 \quad (14)$$

where r1 is the paraxial radius of curvature of the surface of the first lens on the pupil plane side, and r4 is the paraxial radius of curvature of the surface of the second lens on the display plane side.

By satisfying the range of conditional expression (14), it is possible to properly correct spherical aberration, coma aberration, astigmatism, field curvature, and distortion aberration.

It is desirable that the optical system having the above configuration satisfies the following conditional expression (15).

$$1.9 < r1/f < 6.5 \quad (15)$$

where r1 is the paraxial radius of curvature of the surface of the first lens on the pupil plane side, and f is the focal length of the entire optical system.

By satisfying the range of conditional expression (15), it is possible to properly correct spherical aberration, astigmatism, field curvature, and distortion aberration.

It is desirable that the optical system having the above configuration satisfies the following conditional expression (16).

$$7.0 < r1/(D1 + T1) < 34.5 \quad (16)$$

where r1 is the paraxial radius of curvature of the surface of the first lens on the pupil plane side, D1 is the thickness of the first lens on the optical axis, and T1 is the distance on the optical axis from the surface of the first lens on the display plane side to the surface of the second lens on the pupil plane side.

By satisfying the range of conditional expression (16), it is possible to properly correct astigmatism, field curvature, and distortion aberration.

It is desirable that the optical system having the above configuration satisfies the following conditional expression (17).

$$-6.5 < r4/f < -1.9 \quad (17)$$

where r4 is the paraxial radius of curvature of the surface of the second lens on the display plane side, and f is the focal length of the entire optical system.

By satisfying the range of conditional expression (17), it is possible to properly correct coma aberration, astigmatism, field curvature, and distortion aberration.

It is desirable that the optical system having the above configuration satisfies the following conditional expression (18).

$$-45.5 < r4/D2 < -10.0 \quad (18)$$

where r4 is the paraxial radius of curvature of the surface of the second lens on the display plane side, and D2 is the thickness of the second lens on the optical axis.

By satisfying the range of conditional expression (18), it is possible to properly correct coma aberration, astigmatism, field curvature, and distortion aberration while achieving a reduction in height.

It is desirable that the optical system having the above configuration satisfies the following conditional expression (19).

$$-23 < r4/(D1 + D2) < -5 \quad (19)$$

where r4 is the paraxial radius of curvature of the surface of the second lens on the display plane side, D1 is the thickness of the first lens on the optical axis, and D2 is the thickness of the second lens on the optical axis.

By satisfying the range of conditional expression (19), it is possible to properly correct coma aberration, astigmatism, field curvature, and distortion aberration while achieving a reduction in height.

It is desirable that the optical system having the above configuration satisfies the following conditional expression (20).

$$-0.5 < r4/(f1+f2) < -0.1 \quad (20)$$

where r4 is the paraxial radius of curvature of the surface of the second lens on the display plane side, f1 is the focal length of the first lens, and f2 is the focal length of the second lens.

By satisfying the range of conditional expression (20), it is possible to properly correct spherical aberration, coma aberration, astigmatism, field curvature, and distortion aberration.

It is desirable that the optical system having the above configuration satisfies the following conditional expression (21).

$$-1.5 < (r1/r4)/(f1/f2) < -0.5 \quad (21)$$

where r1 is the paraxial radius of curvature of the surface of the first lens on the pupil plane side, r4 is the paraxial radius of curvature of the surface of the second lens on the display plane side, f1 is the focal length of the first lens, and f2 is the focal length of the second lens.

By satisfying the range of conditional expression (21), it is possible to properly correct spherical aberration, coma aberration, astigmatism, field curvature, and distortion aberration.

The disclosure can achieve an optical system that has high resolution with various aberrations properly corrected while satisfying the demands for miniaturization and improvement of light intensity efficiency in a well-balanced manner. Further, with the optical system according to the disclosure, the light intensity efficiency is improved, so it is possible to provide an environmentally friendly optical system through reduction of power consumption in the image display element.

DESCRIPTION OF THE EMBODIMENTS

An embodiment embodying the disclosure will be described in detail hereinafter with reference to the drawings.

FIG. 1, FIG. 4, FIG. 7, FIG. 10, and FIG. 13 are cross-sectional views showing the schematic configurations of the optical systems of Example 1 to Example 5 according to this embodiment, respectively. Further, FIG. 2, FIG. 5, FIG. 8, FIG. 11, and FIG. 14 show partially enlarged views of the optical systems according to Example 1 to Example 5, respectively. Hereinafter, the optical system according to this embodiment will be described in detail with reference to the optical system of Example 1.

Figure 1:
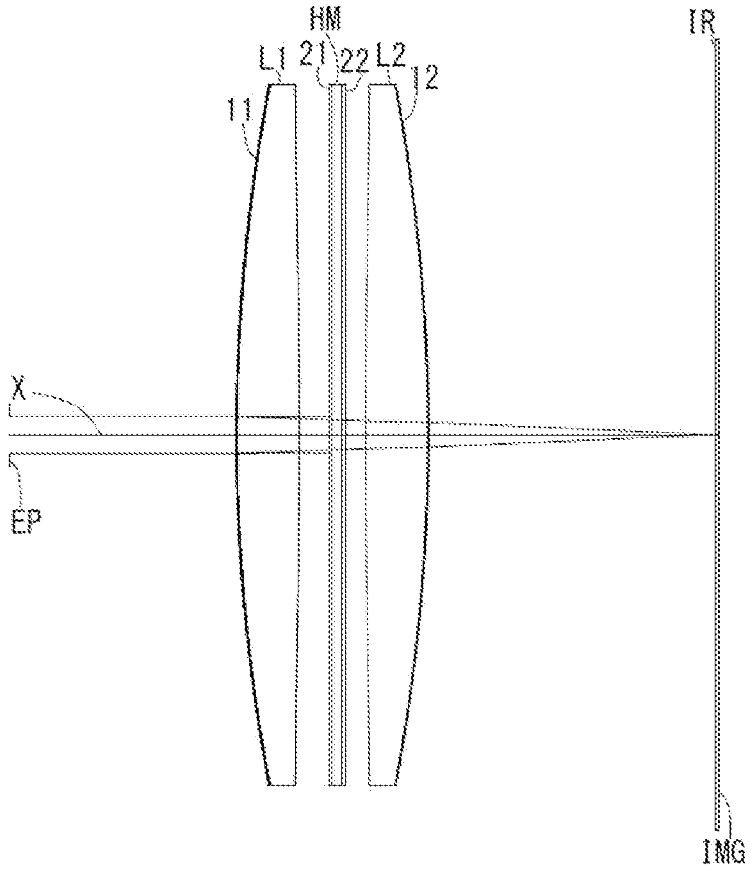
FIG. 1 is a cross-sectional view showing the schematic configuration of the optical system according to Example 1 of the disclosure.

As shown in FIG. 1, the optical system according to this embodiment includes, in order from a pupil plane EP to a display plane IMG of an image display element, a first reflective polarizing plate 11, a first lens L1 having positive refractive power, a half mirror HM, a second lens L2 having positive refractive power, and a second reflective polarizing plate 12. The optical system further includes a first ¼ wavelength plate 21 arranged between the pupil plane EP and the half mirror HM, and a second ¼ wavelength plate 22 arranged between the half mirror HM and the display plane IMG. A filter IR such as a glass block is arranged between the optical system and the display plane IMG. It should be noted that this filter IR can be omitted.

In the optical system, the first reflective polarizing plate 11, the first lens L1, and the first ¼ wavelength plate 21 constitute an element group on the pupil EP side; and the second ¼ wavelength plate 22, the second lens L2, and the second reflective polarizing plate 12 constitute an element group on the display plane IMG side. The element group on the pupil side and the element group on the display plane IMG side are arranged substantially symmetrically with respect to a semi-transmissive surface of the half mirror HM.

Although the object in which the optical system according to this embodiment is installed is not limited, the optical system can be installed, for example, in a head-mounted display as an optical system for magnifying the image displayed on the display plane IMG. In this case, the pupil of the observer is located on the pupil plane EP. A light diaphragm may be arranged on the pupil plane EP.

Further, in the optical system according to this embodiment, anti-reflection type films may be attached to both surfaces of the half mirror HM. Since the anti-reflection type film has a function of preventing reflection of light, such a configuration can prevent a decrease in contrast of the image due to reflection of external light.

Figure 2:
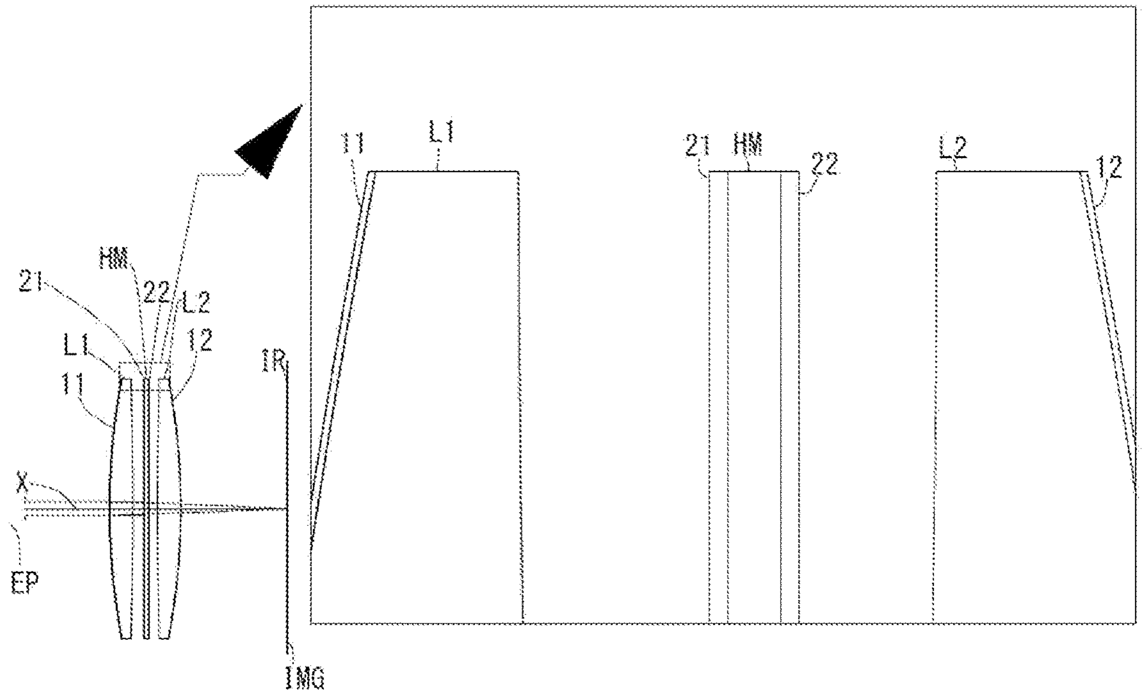
FIG. 2 is a partially enlarged view of the optical system shown in FIG. 1.

As shown in FIG. 2, the surface of the first reflective polarizing plate 11 on the display plane IMG side and the surface of the first lens L1 on the pupil plane side have the same shape, and are attached with adhesive or the like. The first lens L1 has a convex surface on the pupil plane side at the paraxial position. The first lens L1 of this embodiment has a biconvex shape at the paraxial position. According to the shape of the first lens L1, the spacing between the first reflective polarizing plate 11 and the half mirror HM can be reduced, so the effective diameter of the lens can be reduced, thereby reducing the size of the optical system and suppressing spherical aberration, astigmatism, field curvature, and distortion aberration. It should be noted that the shape of the first lens L1 may be configured so that the surface on the pupil plane EP side is a convex surface at the paraxial position and the surface on the display plane IMG side is a flat surface at the paraxial position, as in the optical systems described in Example 4 and Example 5. In this case, the assemblability is improved.

Furthermore, in the optical system according to this embodiment, the first ¼ wavelength plate 21 is attached to the surface of the half mirror HM on the pupil plane EP side, and the second ¼ wavelength plate 22 is attached to the surface of the half mirror HM on the display plane IMG side. Thus, the size of the optical system is reduced and the assemblability is improved. However, the positions of the first ¼ wavelength plate 21 and the second ¼ wavelength plate 22 are not limited thereto. The position of the first ¼ wavelength plate 21 may be between the pupil plane EP and the half mirror HM, and the position of the second ¼ wavelength plate 22 may be between the half mirror HM and the display plane IMG.

Figure 5:
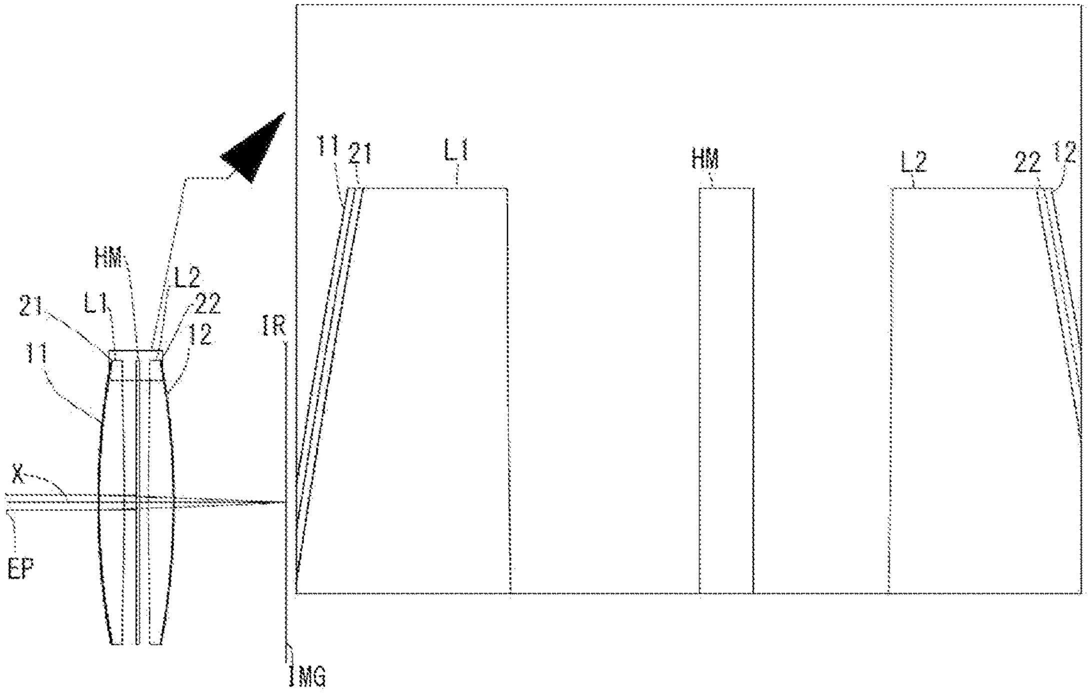
FIG. 5 is a partially enlarged view of the optical system shown in FIG. 4.

The optical system according to Example 2 is an example in which the first ¼ wavelength plate 21 is arranged between the first reflective polarizing plate 11 and the first lens L1, and the second ¼ wavelength plate 22 is arranged between the second lens L2 and the second reflective polarizing plate 12, as shown in FIG. 5. In the case where the first ¼ wavelength plate 21 and the second ¼ wavelength plate 22 are arranged at such positions, a composite film obtained by attaching and integrating the first reflective polarizing plate 11 (second reflective polarizing plate 12) and the first ¼ wavelength plate 21 (second ¼ wavelength plate 22) may be attached to the first lens L1 (second lens L2) to easily manufacture the optical system industrially. Thus, while the costs are reduced, the axial precision between the first reflective polarizing plate 11 (second reflective polarizing plate 12) and the first ¼ wavelength plate 11 (second ¼ wavelength plate 22) can be improved.

Figure 8:
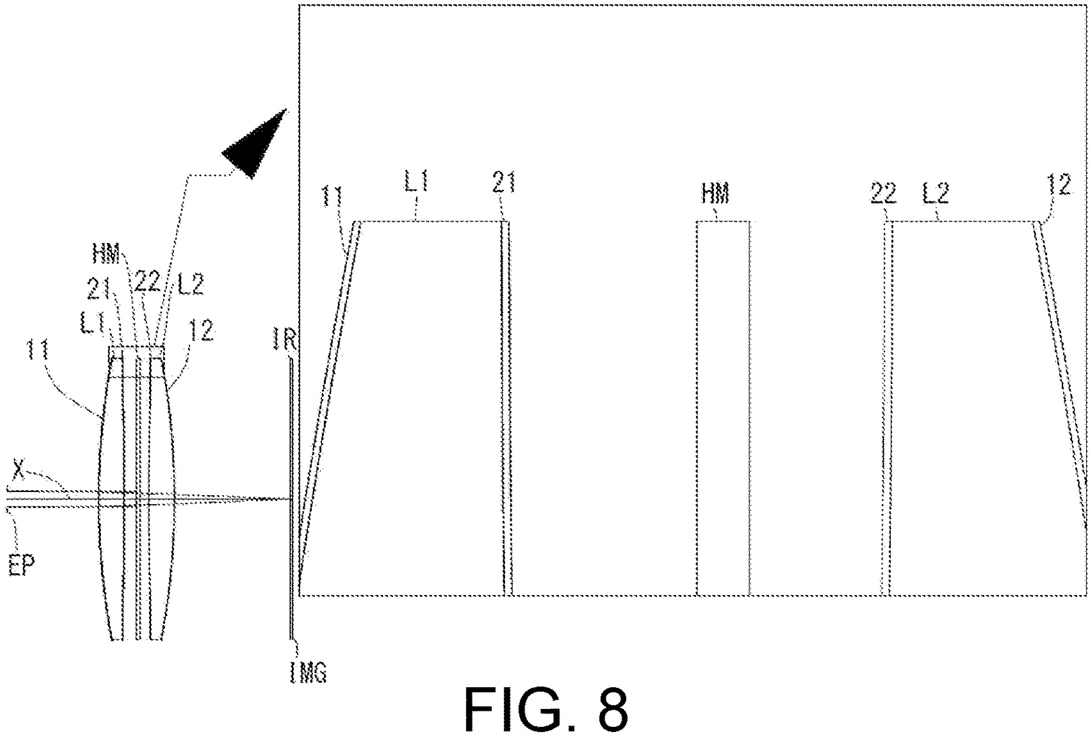
FIG. 8 is a partially enlarged view of the optical system shown in FIG. 7.

Further, the optical system according to Example 3 is an example in which the first ¼ wavelength plate 21 is attached to the surface of the first lens L1 on the display plane IMG side, and the second ¼ wavelength plate 22 is attached to the surface of the second lens L2 on the pupil plane EP side, as shown in FIG. 8. In the case where the first ¼ wavelength plate 21 and the second ¼ wavelength plate 22 are arranged at such positions, optical performance can be ensured by adjusting the axes of the first lens L1 and the second lens L2. Furthermore, since the reflective polarizing plate is attached to one surface of the lens and the ¼ wavelength plate is attached to the other surface, it is easy to attach the reflective polarizing plate and the ¼ wavelength plate.

Figure 14:
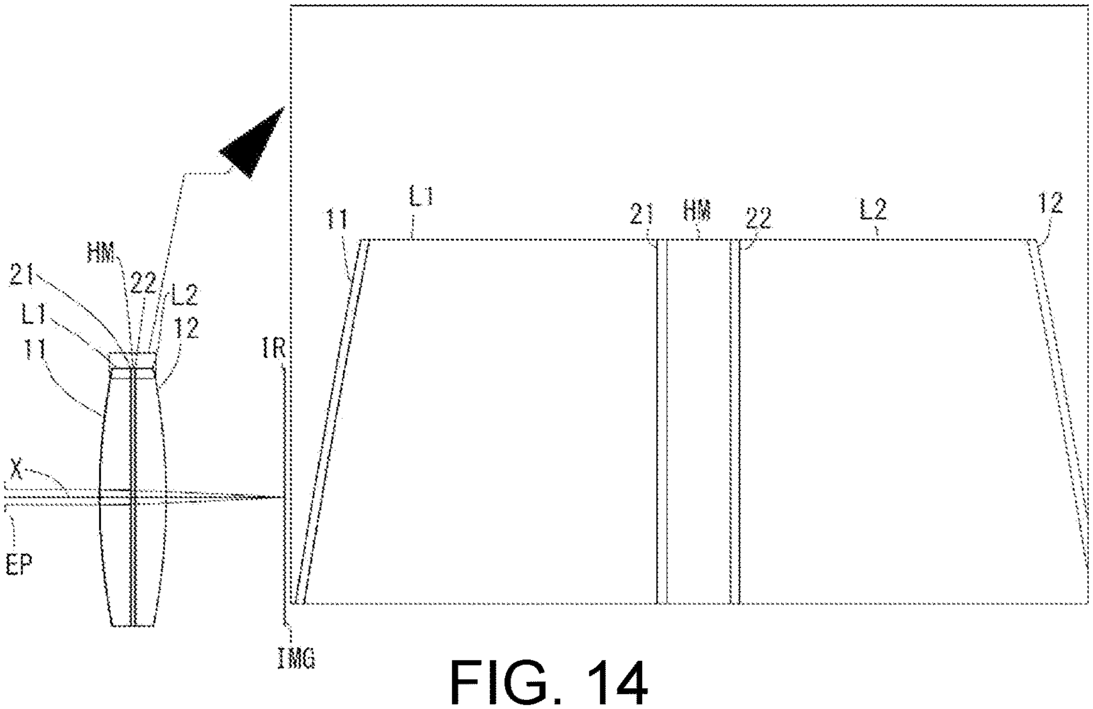
FIG. 14 is a partially enlarged view of the optical system shown in FIG. 13.

In addition, the optical system according to Example 5 is an example in which the first ¼ wavelength plate 21 is arranged between the first lens L1 and the half mirror HM, the second ¼ wavelength plate 22 is arranged between the half mirror HM and the second lens L2, the first ¼ wavelength plate 21 is attached in a manner to be sandwiched between the first lens L1 and the half mirror HM, and the second ¼ wavelength plate 22 is attached in a manner to be sandwiched between the half mirror HM and the second lens L2, as shown in FIG. 14. With this configuration, the first reflective polarizing plate 11, the first lens L1, the first ¼ wavelength plate 21, the half mirror HM, the second ¼ wavelength plate 22, the second lens L2, and the second reflective polarizing plate 12 can be configured as an integrated optical system.

As shown in FIG. 1, the second lens L2 has a convex surface on the display plane side at the paraxial position. The second lens L2 of this embodiment has a biconvex shape at the paraxial position. According to the shape of the second lens L2, spherical aberration, coma aberration, astigmatism, field curvature, and distortion aberration can be properly corrected. The shape of the second lens L2 is not limited to a biconvex shape. The optical systems described in Example 4 and Example 5 are examples of a shape in which the surface on the pupil plane EP side is a flat surface at the paraxial position and the surface on the display plane IMG side is a convex surface at the paraxial position, that is, a plano-convex shape at the paraxial position.

The surface of the second lens L2 on the display plane IMG side and the surface of the second reflective polarizing plate 12 on the pupil plane EP side have the same shape, and are attached with adhesive or the like.

As described above, in the optical system according to this embodiment, the first lens L1 and the second lens L2 are arranged in a manner to sandwich the half mirror HM from both sides. In addition to this basic configuration, the first reflective polarizing plate 11, the first ¼ wavelength plate 21, the second ¼ wavelength plate 22, and the second reflective polarizing plate 12 are respectively arranged at appropriate positions so as to improve the light intensity efficiency of the optical system. This point will be described in detail below.

A liquid crystal display or a micro OLED (Organic Light Emitting Diode) display, for example, can be adopted as a device including the display plane IMG.

Figure 16A:
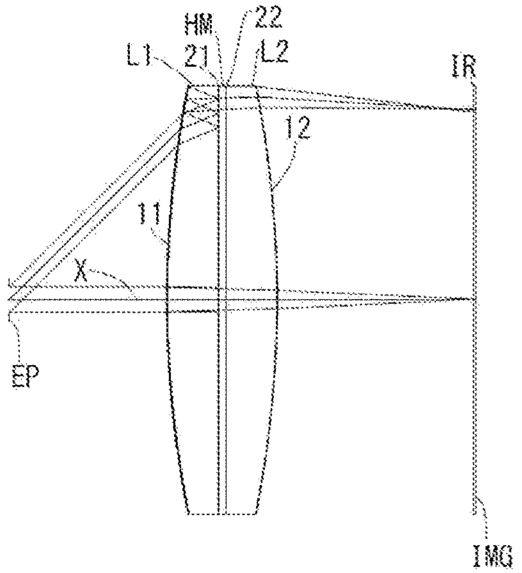
FIG. 16A is a cross-sectional view showing path 1 in the optical system shown in FIG. 13.

As shown in FIG. 16A, the light emitted from the display plane IMG is converted into linearly polarized light by the second reflective polarizing plate 12, converted into circularly polarized light by the second ¼ wavelength plate 22, and enters the half mirror HM. A part of the light that enters the half mirror HM passes through the half mirror HM and is converted by the first ¼ wavelength plate 21 into linearly polarized light having the same polarization direction as when the light passes through the second reflective polarizing plate 12, and enters the first reflective polarizing plate 11. This linearly polarized light is reflected by the polarization selectivity of the first reflective polarizing plate 11. The light reflected by the first reflective polarizing plate 11 is converted into circularly polarized light by the first ¼ wavelength plate 21, enters the half mirror HM, and is reflected there. The light reflected by the half mirror HM becomes circularly polarized light in the reverse direction to the light before reflection. Hereinafter, for convenience, the light traveling along this path is referred to as "light on path 1." In the cross-sectional views of the optical system according to this embodiment shown in FIG. 1, FIG. 4, FIG. 7, FIG. 10, and FIG. 13, only the light on path 1 is shown in order to clarify the schematic configuration of the optical system.

Figure 16B:
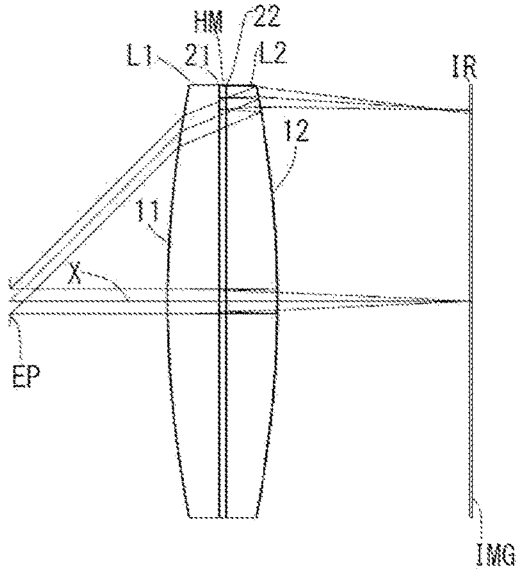
FIG. 16B is a cross-sectional view showing path 2 in the optical system shown in FIG. 13.

On the other hand, as shown in FIG. 16B, a part of the light that is converted into circularly polarized light by the second ¼ wavelength plate 22 and enters the half mirror HM is reflected and becomes circularly polarized light in the reverse direction, and returns to the second ¼ wavelength plate 22. The circularly polarized light returning to the second ¼ wavelength plate 22 is converted into linearly polarized light having a polarization direction orthogonal to the polarization direction when the light first passes through the second reflective polarizing plate 12, and enters the second reflective polarizing plate 12. This linearly polarized light is reflected by the polarization selectivity of the second reflective polarizing plate 12. The light reflected by the second reflective polarizing plate 12 is converted into circularly polarized light by the second ¼ wavelength plate 22, enters and passes through the half mirror HM. Hereinafter, for convenience, the light traveling along this path will be referred to as "light on path 2."

The light on path 1 and the light on path 2 merge at the half mirror HM section. The circularly polarized light that merges at the half mirror HM section is converted by the first ¼ wavelength plate 21 into linearly polarized light having a polarization direction orthogonal to the polarization direction when the light first passes through the second reflective polarizing plate 12, and enters the first reflective polarizing plate 11. This linearly polarized light passes through the first reflective polarizing plate 11 due to the polarization selectivity thereof and is guided to the pupil plane EP. Therefore, with the optical system according to this embodiment, the light intensity efficiency of the optical system is improved, and the light intensity efficiency can be improved by up to 50%. Besides, power consumption in the image display element can be reduced.

On the other hand, this type of conventional general optical system has low light intensity efficiency of 25% or less, and in order to obtain a bright image on the pupil plane, it is necessary to increase the luminance of the display plane. Here, this conventional optical system will be described briefly. The conventional optical system generally includes a reflective polarizing plate, a first ¼ wavelength plate, a lens having refractive power, a half mirror, and a second ¼ wavelength plate, in order from the pupil plane side to the display plane side. The light emitted from the display plane in the optical system passes through the second ¼ wavelength plate, the half mirror, the lens, and the first ¼ wavelength plate and is reflected by the reflective polarizing plate, and then enters the half mirror again. The light entering the half mirror is reflected in the half mirror, and then passes through the first ¼ wavelength plate and the reflective polarizing plate and reaches the pupil plane. In this light path, the light enters the half mirror twice, so the amount of light that reaches the pupil plane from the display plane ultimately becomes 25% or less. This means that, in the conventional optical system, in order to obtain the same level of brightness as the optical system according to this embodiment on the pupil plane, it is necessary to increase the luminance of the display plane, and the power consumption of the image display element increases.

Regarding this point, in the optical system according to this embodiment, the light emitted from the display plane IMG and reflected in the half mirror HM is utilized actively as the light on path 2, thereby achieving higher light intensity efficiency than before.

The optical system in this embodiment achieves favorable effects by satisfying the following conditional expressions (1) to (21).

$$14 < r1/T1 < 250 \quad (1)$$

$$0.7 < (D2/f2) \times 100 < 5.0 \quad (2)$$

$$55 < f2/hm2 < 3100 \quad (3)$$

$$3 < f2/f < 11 \quad (4)$$

$$10 < (f1 + f2)/f < 22 \quad (5)$$

$$0.25 < r1/f1 < 1.00 \quad (6)$$

$$0.1 < r1/(f1 + f2) < 0.5 \quad (7)$$

$$-1.00 < r4/f2 < -0.25 \quad (8)$$

$$-3.50 < r4/f2 \times D2 < -0.85 \quad (9)$$

$$41 < vd2 < 70 \quad (10)$$

$$0.9 < (D1/f1) \times 100 < 4.0 \quad (11)$$

$$3 < f1/f < 11 \quad (12)$$

$$0.5 < f1/f2 < 1.5 \quad (13)$$

$$-1.5 < r1/r4 < -0.5 \quad (14)$$

$$1.9 < r1/f < 6.5 \quad (15)$$

$$7.0 < r1/(D1 + T1) < 34.5 \quad (16)$$

$$-6.5 < r4/f < -1.9 \quad (17)$$

$$-45.5 < r4/D2 < -10.0 \quad (18)$$

$$-23 < r4/(D1 + D2) < -5 \quad (19)$$

$$-0.5 < r4/(f1 + f2) < -0.1 \quad (20)$$

$$-1.5 < (r1/r4)/(f1/f2) < -0.5 \quad (21)$$

where vd2: Abbe number for the d-line of the second lens L2

D1: Thickness of the first lens L1 on the optical axis X

D2: Thickness of the second lens L2 on the optical axis X

T1: Distance on the optical axis X from the surface of the first lens L1 on the display plane side to the surface of the second lens L2 on the pupil plane side hm2: Distance on the optical axis X from the surface of the half mirror HM on the display plane side to the surface of the second lens L2 on the pupil plane side f: Focal length of the entire optical system f1: Focal length of the first lens L1 f2: Focal length of the second lens L2 r1: Paraxial radius of curvature of the surface of the first lens L1 on the pupil plane side r4: Paraxial radius of curvature of the surface of the second lens L2 on the display plane side It should be noted that it is not necessary to satisfy all of the above conditional expressions, and the effects corresponding to each conditional expression can be obtained by satisfying each conditional expression independently.

Further, the optical system in this embodiment achieves more favorable effects by satisfying the following conditional expressions (1a) to (21a).

$$21 < r1/T1 < 180 \quad (1a)$$

$$1.3 < (D2/f2) \times 100 < 3.5 \quad (2a)$$

$$90 < f2/hm2 < 2500 \quad (3a)$$

$$4.5 < f2/f < 9.0 \quad (4a)$$

$$11.5 < (f1+f2)/f < 18.5 \quad (5a)$$

$$0.40 < r1/f1 < 0.85 \quad (6a)$$

$$0.2 < r1/(f1+f2) < 0.4 \quad (7a)$$

$$-0.85 < r4/f2 < -0.40 \quad (8a)$$

$$-2.8 < r4/f2 \times D2 < -1.4 \quad (9a)$$

$$49 < vd2 < 63 \quad (10a)$$

$$1.4 < (D1/f1) \times 100 < 3.3 \quad (11a)$$

$$4.5 < f1/f < 9.0 \quad (12a)$$

$$0.75 < f1/f2 < 1.25 \quad (13a)$$

$$-1.25 < r1/r4 < -0.75 \quad (14a)$$

$$2.9 < r1/f < 5.5 \quad (15a)$$

$$11 < r1/(D1+T1) < 28 \quad (16a)$$

$$-5.5 < r4/f < -2.9 \quad (17a)$$

$$-38 < r4/D2 < -15 \quad (18a)$$

$$-19 < r4/(D1+D2) < -8 \quad (19a)$$

$$-0.4 < r4/(f1+f2) < -0.2 \quad (20a)$$

$$-1.25 < (r1/r4)/(f1/f2) < -0.75 \quad (21a)$$

where the signs of each conditional expression are the same as those described in the previous paragraph. It should be noted that the lower limit values or upper limit values of the corresponding conditional expressions (1) to (21) may be applied as the lower limit values or upper limit values for conditional expressions (1a) to (21a), respectively.

In this embodiment, the aspherical shape adopted for the aspherical surface of the lens surface is expressed by Formula 1, where the axis in the optical axis direction is Z, the height in the direction orthogonal to the optical axis is H, the paraxial radius of curvature is R, the conic coefficient is k, and the aspheric coefficient is A4, A6, A8, A10, A12, A14, A16, A18, and A20.

[Formula 1]

$$Z = \frac{\frac{H^2}{R}}{1+\sqrt{1-(k+1)\frac{H^2}{R^2}}} + A_4H^4 + A_6H^6 + A_8H^8 + A_{10}H^{10} + A_{12}H^{12} + A_{14}H^{14} + A_{16}H^{16} + A_{18}H^{18} + A_{20}H^{20}$$

Next, examples of the optical system according to this embodiment will be shown. In each example, f represents the focal length of the entire optical system, Fno represents the F number, ω represents the half angle of view, ih represents the maximum image height, and TTL represents the total optical length. Here, the total optical length is defined as the distance on the optical axis from the pupil plane to the display plane. It should be noted that the values of the total optical length and back focus are distances obtained by converting the thickness of the filter IR arranged between the optical system and the display plane IMG into air.

Also, i represents the surface number counted from the pupil plane side, r represents the paraxial radius of curvature, d represents the distance between the lens surfaces on the optical axis (surface spacing), Nd represents the refractive index of the d-line (reference wavelength), and vd represents the Abbe number for the d-line. Aspherical surfaces are indicated by adding an asterisk (*) after the surface number i.

In the optical system of each example, the spacing between the pupil plane EP as an eye point on the optical axis and the lens surface closest to the pupil plane side is referred to as pupil distance. In evaluating aberration, there is a one-to-one correspondence between the aberration of the light that has a light emitting point on the display plane side and reaches the pupil plane EP, and the aberration of the light that has a light emitting point on the pupil plane EP side and reaches the display plane IMG. Therefore, in each example, the aberration of the light reaching the display plane IMG is evaluated. FIG. 3A to FIG. 3C, FIG. 6A to FIG. 6C, FIG. 9A to FIG. 9C, FIG. 12A to FIG. 12C, and FIG. 15A to FIG. 15C are aberration diagrams when the pupil diameter of the observer (human being) is Φ2.0 mm and the pupil distance is 12 mm in the optical systems of Example 1 to Example 5.

Example 1

Basic lens data is shown in Table 1 below.

TABLE 1

Unit mm f = 23.20
Fno = 11.60
ω(°) = 45.0
ih = 17.40
TTL = 37.60

Surface data

| i | r | d | Nd | vd | |
|---|---|---|---|---|---|
| 1 (pupil plane) | Infinity | 12.0000 | | | |
| 2 | 100.0000 | 0.0000 | 1.492 | 57.44 | |
| 3 | 100.0000 | 0.0680 | 1.492 | 57.44 | |
| 4 | 100.0000 | 0.0000 | | | |
| 5 | 100.0000 | 3.2957 | 1.544 | 55.93 | (vd1) |
| 6* | −401.2513 | 1.5866 | | | |
| 7 | Infinity | 0.1720 | 1.492 | 57.44 | |
| 8 (reflective plane) | Infinity | 0.0000 | | | |
| 9 | Infinity | −0.1720 | 1.492 | 57.44 | |
| 10 | Infinity | −1.5866 | | | |
| 11* | −401.2513 | −3.2957 | 1.544 | 55.93 | |
| 12 | 100.0000 | 0.0000 | | | |
| 13 | 100.0000 | −0.0680 | 1.492 | 57.44 | |
| 14 (reflective plane) | 100.0000 | 0.0000 | | | |
| 15 | 100.0000 | 0.0680 | 1.492 | 57.44 | |
| 16 | 100.0000 | 0.0000 | | | |
| 17 | 100.0000 | 3.2957 | 1.544 | 55.93 | |
| 18* | −401.2513 | 1.5866 | | | |
| 19 | Infinity | 0.1720 | 1.492 | 57.44 | |
| 20 | Infinity | 0.5000 | 1.517 | 64.20 | |
| 21 | Infinity | 0.1720 | 1.492 | 57.44 | |
| 22 | Infinity | 1.0866 | | | |
| 23* | 401.2513 | 3.2957 | 1.544 | 55.93 | (vd2) |
| 24 | −100.0000 | 0.0000 | | | |
| 25 | −100.0000 | 0.0680 | 1.492 | 57.44 | |

TABLE 1-continued

| | | | | | |
|---|---|---|---|---|---|
| 26 | −100.0000 | 0.0000 | 1.492 | 57.44 | |
| 27 | −100.0000 | 15.2024 | | | |
| 28 | Infinity | 0.2260 | 1.458 | 67.82 | |
| 29 | Infinity | 0.0000 | | | |
| Display plane | Infinity | | | | |

Single lens data

| Lens | Start surface | Focal length |
|---|---|---|
| 1 | 5 | 147.411 |
| 2 | 23 | 147.411 |

Aspherical data

| | 6th surface | 23rd surface |
|---|---|---|
| k | 2.000000E+01 | 2.000000E+01 |
| A4 | −1.022570E−06 | 1.022570E−06 |
| A6 | 2.694257E−07 | −2.694257E−07 |
| A8 | −6.400911E−09 | 6.400911E−09 |
| A10 | 7.337807E−11 | −7.337807E−11 |
| A12 | −4.735854E−13 | 4.735854E−13 |
| A14 | 1.809151E−15 | −1.809151E−15 |
| A16 | −4.058114E−18 | 4.058114E−18 |
| A18 | 4.940757E−21 | −4.940757E−21 |
| A20 | −2.520500E−24 | 2.520500E−24 |

The optical system of Example 1 satisfies conditional expressions (1) to (21) as shown in Table 6.

Figures 3A, 3B, 3C:
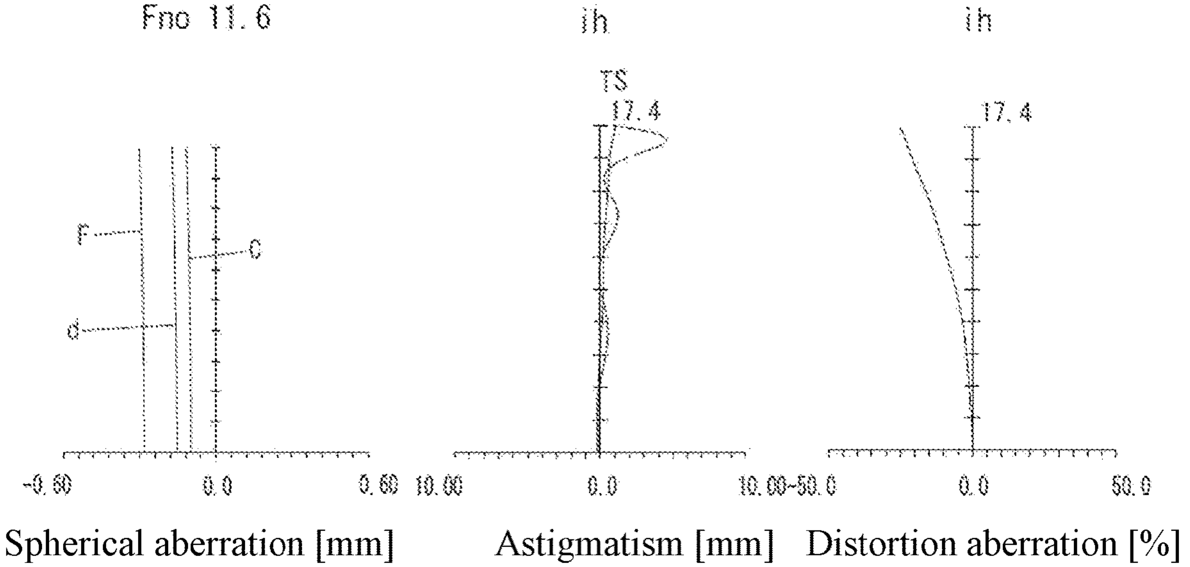
FIG. 3A to FIG. 3C are aberration diagrams showing spherical aberration, astigmatism, and distortion aberration of the optical system shown in FIG. 1.
Figure 4:
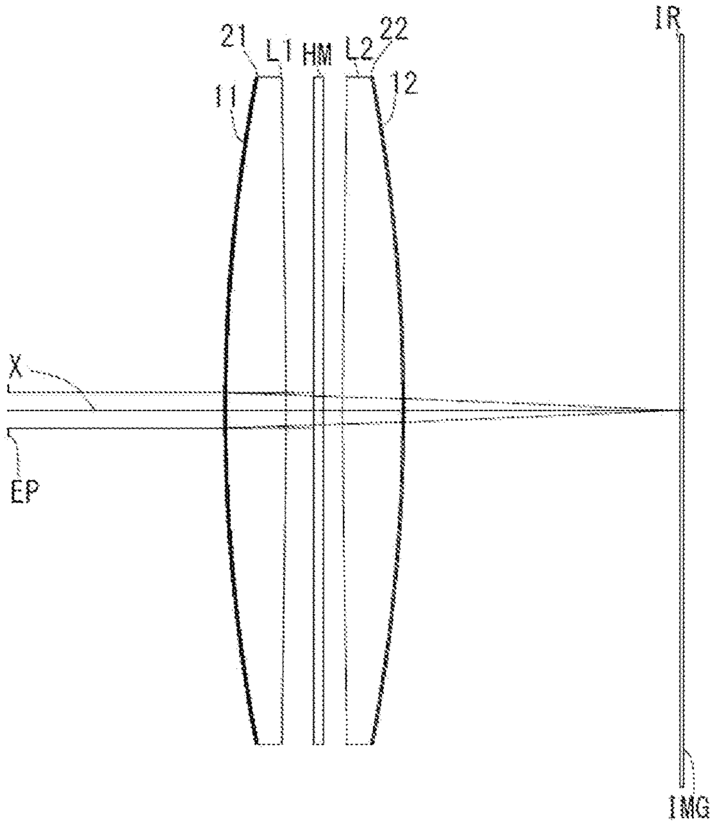
FIG. 4 is a cross-sectional view showing the schematic configuration of the optical system according to Example 2 of the disclosure.

FIG. 3A to FIG. 3C show spherical aberration (mm), astigmatism (mm), and distortion aberration (%) for the optical system of Example 1. The spherical aberration diagram shows the amount of aberration for each wavelength of F-line (486 nm), d-line (588 nm), and C-line (656 nm). In addition, the astigmatism diagram shows the amount of aberration of d-line on the sagittal image plane S (solid line) and the amount of aberration of d-line on the tangential image plane T (broken line), respectively (the same applies to FIG. 6A to FIG. 6C, FIG. 9A to FIG. 9C, FIG. 12A to FIG. 12C, and FIG. 15A to FIG. 15C). As shown in FIG. 3A to FIG. 3C, each aberration is properly corrected.

Example 2

Basic lens data is shown in Table 2 below.

TABLE 2

Unit mm f = 23.16
Fno = 11.60
ω(°) = 45.0
ih = 17.40
TTL = 37.51

Surface data

| i | r | d | Nd | vd | |
|---|---|---|---|---|---|
| 1 (pupil plane) | Infinity | 12.0000 | | | |
| 2 | 100.0000 | 0.0000 | 1.492 | 57.44 | |
| 3 | 100.0000 | 0.0680 | 1.492 | 57.44 | |
| 4 | 100.0000 | 0.0720 | 1.492 | 57.44 | |
| 5 | 100.0000 | 0.0000 | | | |
| 6 | 100.0000 | 3.2957 | 1.544 | 55.93 | (vd1) |
| 7* | −401.2513 | 1.5866 | | | |
| 8 (reflective plane) | Infinity | 0.0000 | | | |
| 9 | Infinity | −1.5866 | | | |
| 10* | −401.2513 | −3.2957 | 1.544 | 55.93 | |
| 11 | 100.0000 | 0.0000 | | | |
| 12 | 100.0000 | −0.0720 | 1.492 | 57.44 | |
| 13 | 100.0000 | 0.0680 | 1.492 | 57.44 | |
| 14 (reflective plane) | 100.0000 | 0.0000 | | | |
| 15 | 100.0000 | 0.0680 | 1.492 | 57.44 | |
| 16 | 100.0000 | 0.0720 | 1.492 | 57.44 | |
| 17 | 100.0000 | 0.0000 | | | |
| 18 | 100.0000 | 3.2957 | 1.544 | 55.93 | |
| 19* | −401.2513 | 1.5866 | | | |
| 20 | Infinity | 0.5000 | 1.517 | 64.20 | |
| 21 | Infinity | 1.0866 | | | |
| 22* | 401.2513 | 3.2957 | 1.544 | 55.93 | (vd2) |
| 23 | −100.0000 | 0.0000 | | | |
| 24 | −100.0000 | 0.0720 | 1.492 | 57.44 | |
| 25 | −100.0000 | 0.0680 | 1.492 | 57.44 | |
| 26 | −100.0000 | 0.0000 | 1.492 | 57.44 | |
| 27 | −100.0000 | 15.3131 | | | |
| 28 | Infinity | 0.2260 | 1.458 | 67.82 | |
| 29 | Infinity | 0.0000 | | | |
| Display plane | Infinity | | | | |

Single lens data

| Lens | Start surface | Focal length |
|---|---|---|
| 1 | 6 | 147.411 |
| 2 | 22 | 147.411 |

Aspherical data

| | 7th surface | 22nd surface |
|---|---|---|
| k | 2.000000E+01 | 2.000000E+01 |
| A4 | −1.022570E−06 | 1.022570E−06 |
| A6 | 2.694257E−07 | −2.694257E−07 |
| A8 | −6.400911E−09 | 6.400911E−09 |
| A10 | 7.337807E−11 | −7.337807E−11 |
| A12 | −4.735854E−13 | 4.735854E−13 |
| A14 | 1.809151E−15 | −1.809151E−15 |
| A16 | −4.058114E−18 | 4.058114E−18 |
| A18 | 4.940757E−21 | −4.940757E−21 |
| A20 | −2.520500E−24 | 2.520500E−24 |

The optical system of Example 2 satisfies conditional expressions (1) to (21) as shown in Table 6.

Figures 6A, 6B, 6C:
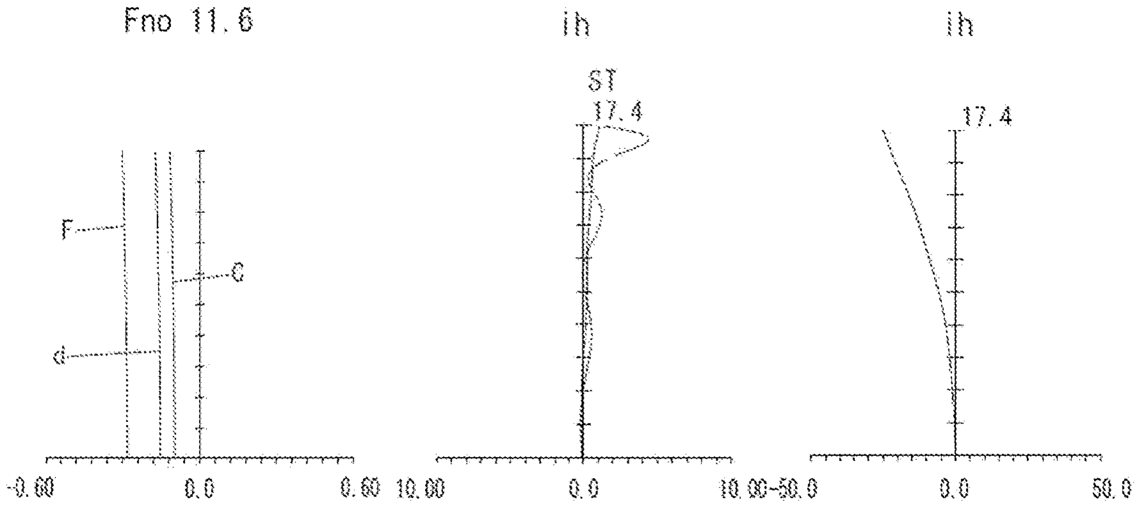
FIG. 6A to FIG. 6C are aberration diagrams showing spherical aberration, astigmatism, and distortion aberration of the optical system shown in FIG. 4.
Figure 7:
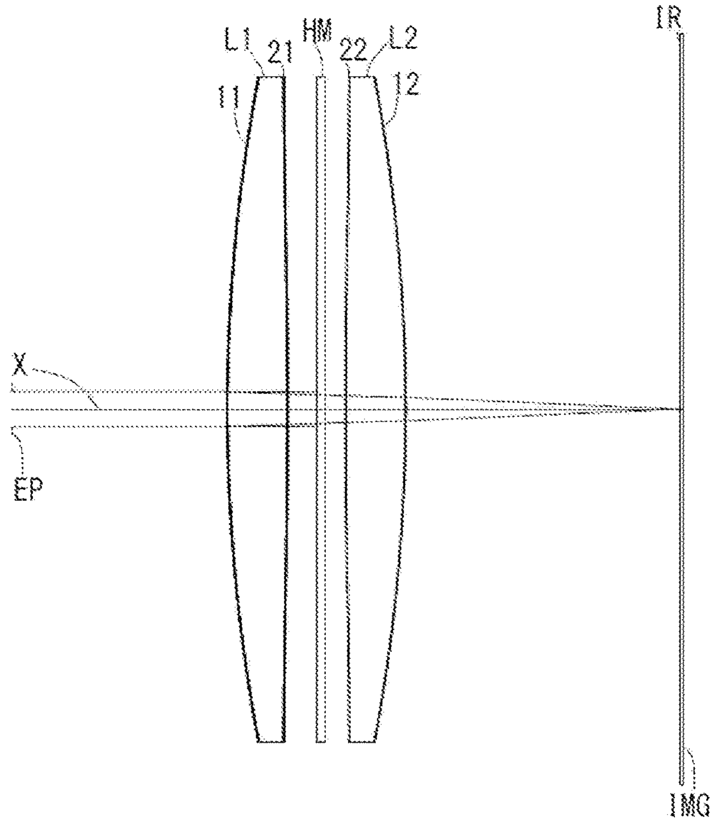
FIG. 7 is a cross-sectional view showing the schematic configuration of the optical system according to Example 3 of the disclosure.

FIG. 6A to FIG. 6C show spherical aberration (mm), astigmatism (mm), and distortion aberration (%) for the optical system of Example 2. As shown in FIG. 6A to FIG. 6C, each aberration is properly corrected.

Example 3

Basic lens data is shown in Table 3 below.

TABLE 3

Unit mm f = 23.16
Fno = 11.60
ω(°) = 45.0
ih = 17.40
TTL = 37.51

Surface data

| i | r | d | | Nd | vd | |
|---|---|---|---|---|---|---|
| 1 (pupil plane) | Infinity | 12.0000 | | | | |
| 2 | 100.0000 | 0.0000 | | 1.492 | 57.44 | |
| 3 | 100.0000 | 0.0680 | | 1.492 | 57.44 | |
| 4 | 100.0000 | 0.0000 | | | | |
| 5 | 100.0000 | 3.2957 | | 1.544 | 55.93 | (vd1) |
| 6* | −401.2513 | 0.0000 | | | | |
| 7* | −401.2513 | 0.0720 | | 1.492 | 57.44 | |
| 8* | −401.2513 | 1.5866 | | | | |
| 9 (reflective plane) | Infinity | 0.0000 | MIRROR | | | |

TABLE 3-continued

| | | | | | | |
|---|---|---|---|---|---|---|
| 10* | −401.2513 | −1.5866 | | | | |
| 11* | −401.2513 | −0.0720 | | 1.492 | 57.44 | |
| 12* | −401.2513 | 0.0000 | | | | |
| 13* | −401.2513 | −3.2957 | | 1.544 | 55.93 | |
| 14 | 100.0000 | 0.0000 | | | | |
| 15 | 100.0000 | −0.0680 | | 1.492 | 57.44 | |
| 16 (reflective plane) | 100.0000 | 0.0000 | MIRROR | | | |
| 17 | 100.0000 | 0.0680 | | 1.492 | 57.44 | |
| 17 | 100.0000 | 0.0000 | | | | |
| 18 | 100.0000 | 3.2957 | | 1.544 | 55.93 | |
| 19* | −401.2513 | 0.0000 | | | | |
| 20* | 401.2513 | 0.0720 | | 1.492 | 57.44 | |
| 21* | −401.2513 | 1.5866 | | | | |
| 22 | Infinity | 0.5000 | | 1.517 | 64.20 | |
| 22 | Infinity | 1.0866 | | | | |
| 24* | 401.2513 | 0.0720 | | 1.492 | 57.44 | |
| 25* | 401.2513 | 0.0000 | | | | |
| 26* | 401.2513 | 3.2957 | | 1.544 | 55.93 | (vd2) |
| 27 | −100.0000 | 0.0000 | | | | |
| 28 | −100.0000 | 0.0680 | | 1.492 | 57.44 | |
| 29 | −100.0000 | 0.0000 | | 1.492 | 57.44 | |
| 30 | −100.0000 | 15.3130 | | | | |
| 31 | Infinity | 0.2260 | | 1.458 | 67.82 | |
| 32 | Infinity | 0.0000 | | | | |
| Display plane | Infinity | | | | | |

Single lens data

| Lens | Start surface | Focal length |
|---|---|---|
| 1 | 5 | 147.411 |
| 2 | 26 | 147.411 |

Aspherical data

| | 6th surface | 26th surface |
|---|---|---|
| K | 2.000000E+01 | 2.000000E+01 |
| A4 | −1.022570E−06 | 1.022570E−06 |
| A6 | 2.694257E−07 | −2.694257E−07 |
| A8 | −6.400911E−09 | 6.400911E−09 |
| A10 | 7.337807E−11 | −7.337807E−11 |
| A12 | −4.735854E−13 | 4.735854E−13 |
| A14 | 1.809151E−15 | −1.809151E−15 |
| A16 | −4.058114E−18 | 4.058114E−18 |
| A18 | 4.940757E−21 | −4.940757E−21 |
| A20 | −2.520500E−24 | 2.520500E−24 |

The optical system of Example 3 satisfies conditional expressions (1) to (21) as shown in Table 6.

Figure 9A:
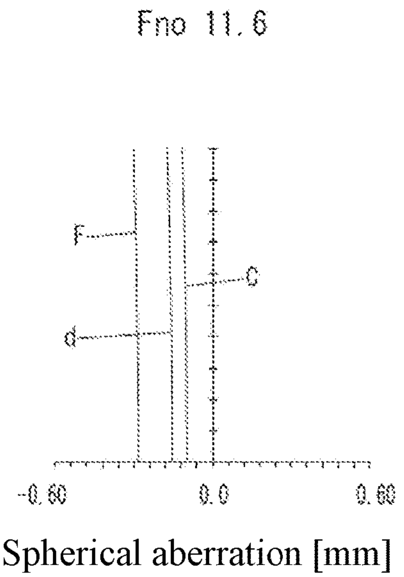
FIG. 9A to FIG. 9C are aberration diagrams showing spherical aberration, astigmatism, and distortion aberration of the optical system shown in FIG. 7.
Figure 9B:
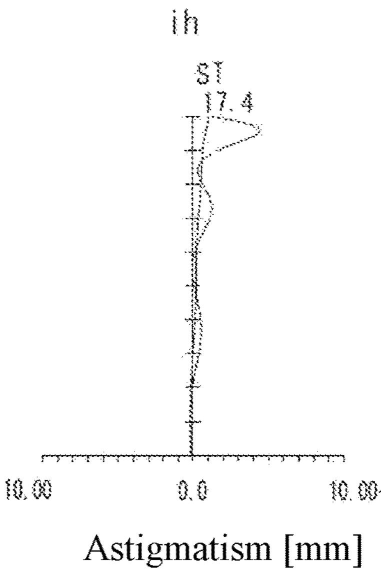
Figure 9C:
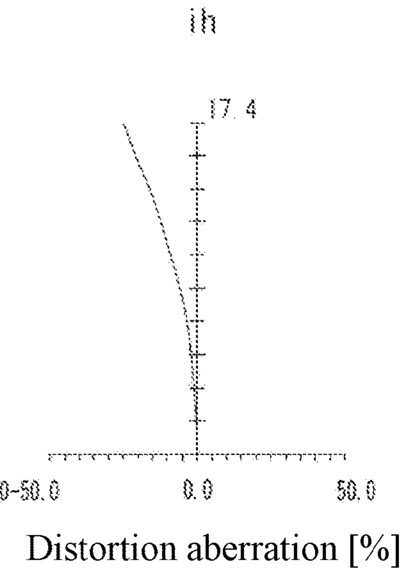
Figure 10:
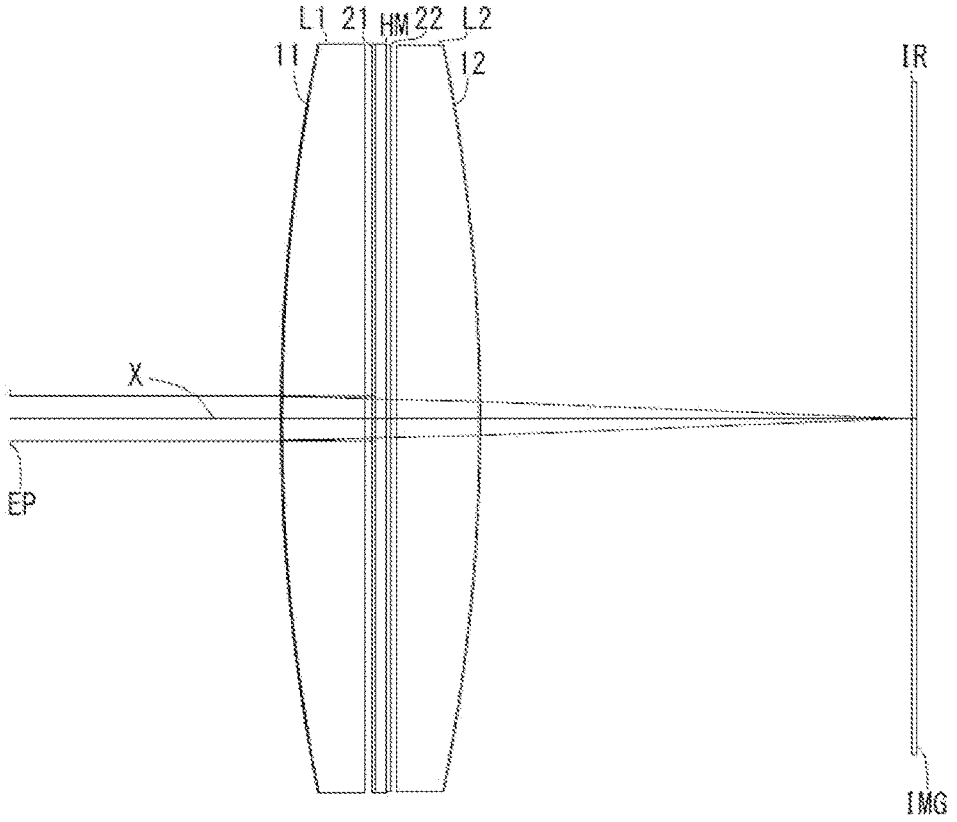
FIG. 10 is a cross-sectional view showing the schematic configuration of the optical system according to Example 4 of the disclosure.
Figure 11:
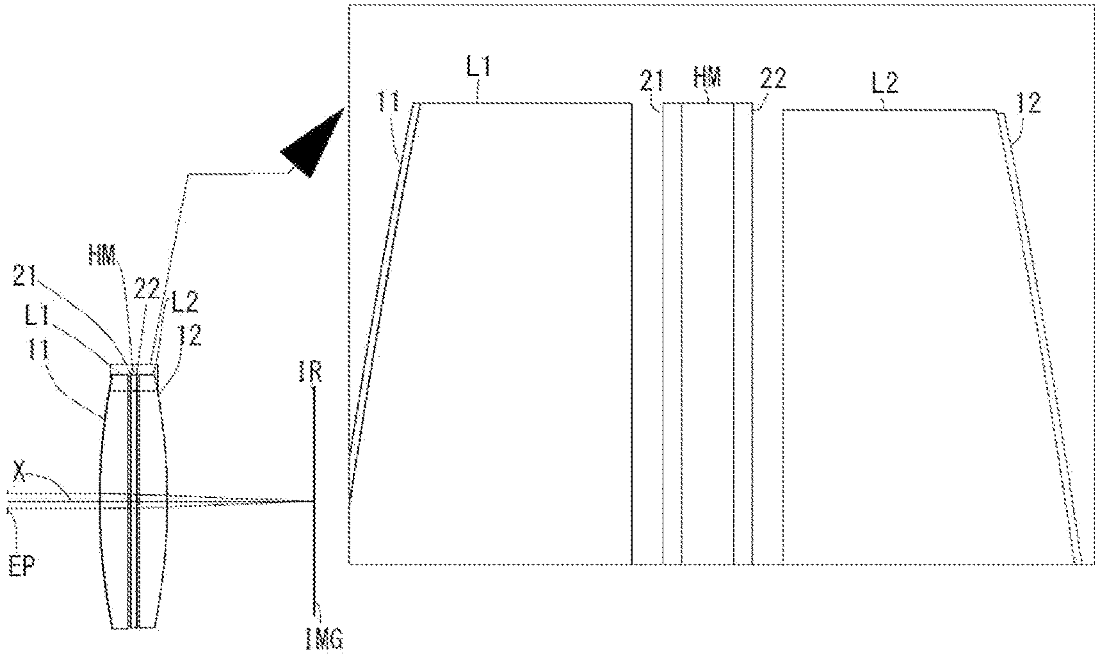
FIG. 11 is a partially enlarged view of the optical system shown in FIG. 10.

FIG. 9A to FIG. 9C show spherical aberration (mm), astigmatism (mm), and distortion aberration (%) for the optical system of Example 3. As shown in FIG. 9A to FIG. 9C, each aberration is properly corrected.

Example 4

Basic lens data is shown in Table 4 below.

TABLE 4

| Unit mm |
|---|
| f = 25.31 |
| Fno = 12.50 |
| ω(°) = 45.0 |
| ih = 14.40 |
| TTL = 40.22 |

TABLE 4-continued

Surface data

| i | r | d | Nd | vd | |
|---|---|---|---|---|---|
| 1 (pupil plane) | Infinity | 12.0000 | | | |
| 2* | 100.0000 | 0.0680 | 1.492 | 57.44 | |
| 3* | 100.0000 | 3.6501 | 1.544 | 55.93 | |
| 4 | Infinity | 0.3000 | | | |
| 5 | Infinity | 0.1720 | 1.492 | 57.44 | (vd1) |
| 6 (reflective plane) | Infinity | 0.0000 | | | |
| 7 | Infinity | −0.1720 | 1.492 | 57.44 | |
| 8 | Infinity | −0.3000 | | | |
| 9 | Infinity | −3.6501 | 1.544 | 55.93 | |
| 10* | 100.0000 | 0.0000 | | | |
| 11* | 100.0000 | −0.0680 | 1.492 | 57.44 | |
| 12* (reflective plane) | 100.0000 | 0.0000 | | | |
| 13* | 100.0000 | 0.0680 | 1.492 | 57.44 | |
| 14* | 100.0000 | 3.6501 | 1.544 | 55.93 | |
| 15 | Infinity | 0.3000 | | | |
| 16 | Infinity | 0.1720 | 1.492 | 57.44 | |
| 17 | Infinity | 0.5000 | 1.517 | 64.20 | |
| 18 | Infinity | 0.1720 | 1.492 | 57.44 | |
| 19 | Infinity | 0.3000 | | | |
| 20 | Infinity | 3.6501 | 1.544 | 55.93 | |
| 21* | −100.0000 | 0.0680 | 1.492 | 57.44 | |
| 22 | Infinity | 19.1815 | | | |
| 23 | Infinity | 0.2260 | 1.458 | 67.82 | (vd2) |
| 24 | Infinity | 0.0000 | | | |
| Display plane | Infinity | | | | |

Single lens data

| Lens | Start surface | Focal length |
|---|---|---|
| 1 | 3 | 183.723 |
| 2 | 20 | 183.723 |

Aspherical data

| | 3rd surface | 21st surface |
|---|---|---|
| k | 4.301123E+00 | 4.301123E+00 |
| A4 | 1.730072E−05 | −1.730072E−05 |
| A6 | −1.419245E−07 | 1.419245E−07 |
| A8 | 5.456371E−10 | −5.456371E−10 |
| A10 | −1.032100E−12 | 1.032100E−12 |
| A12 | 8.000000E−16 | −8.000000E−16 |
| A14 | 0.000000E+00 | 0.000000E+00 |
| A16 | 0.000000E+00 | 0.000000E+00 |
| A18 | 0.000000E+00 | 0.000000E+00 |
| A20 | 0.000000E+00 | 0.000000E+00 |

The optical system of Example 4 satisfies conditional expressions (1) to (21) as shown in Table 6.

Figure 12A:
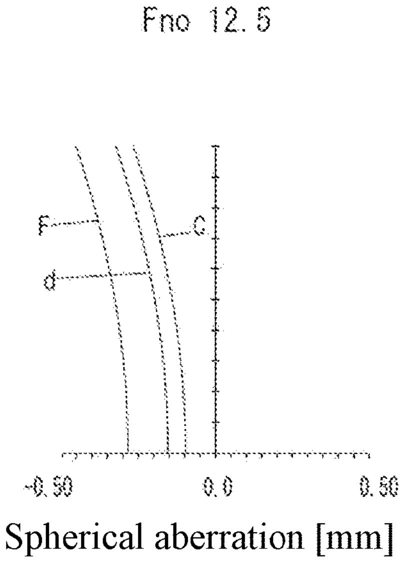
FIG. 12A to FIG. 12C are aberration diagrams showing spherical aberration, astigmatism, and distortion aberration of the optical system shown in FIG. 10.
Figure 12B:
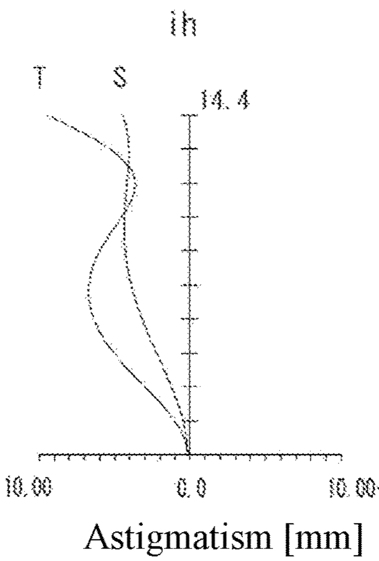
Figure 12C:
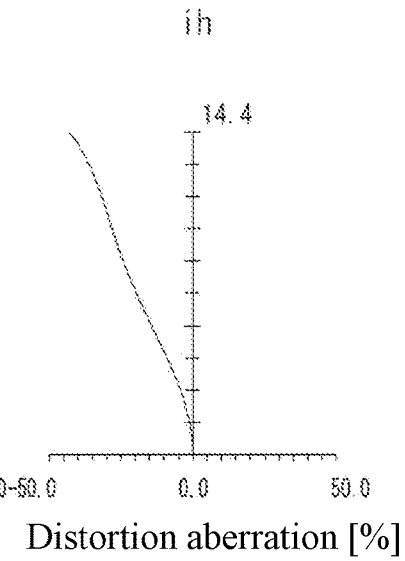
Figure 13:
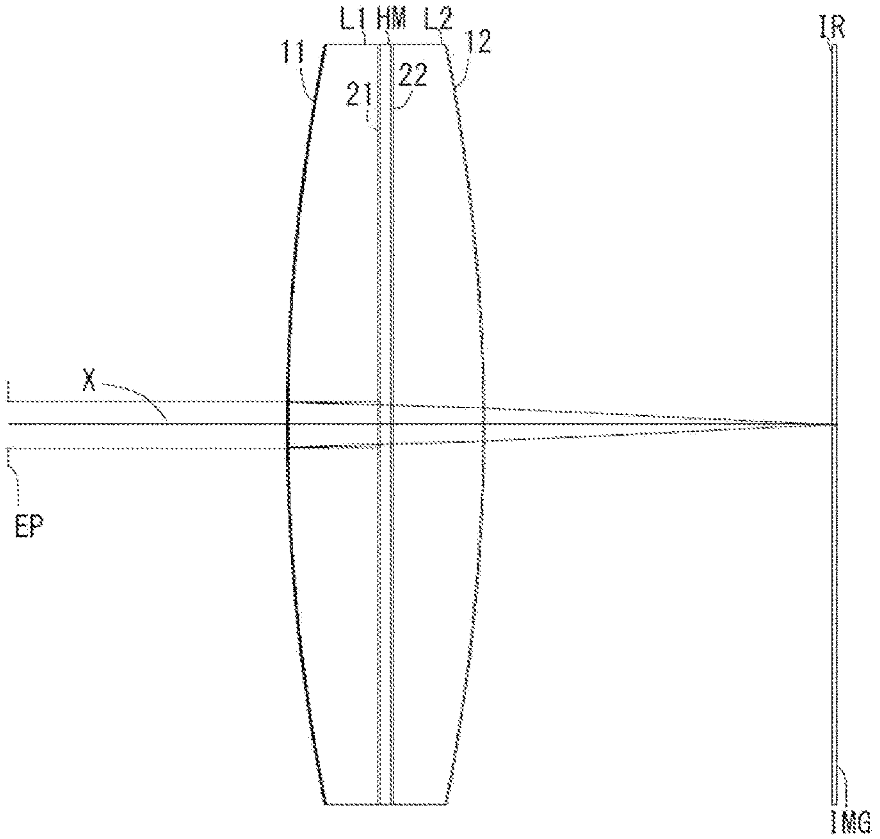
FIG. 13 is a cross-sectional view showing the schematic configuration of the optical system according to Example 5 of the disclosure.

FIG. 12A to FIG. 12C show spherical aberration (mm), astigmatism (mm), and distortion aberration (%) for the optical system of Example 4. As shown in FIG. 12A to FIG. 12C, each aberration is properly corrected.

Example 5

Basic lens data is shown in Table 5 below.

TABLE 5

| Unit mm |
|---|
| f = 20.67 |
| Fno = 10.00 |
| ω(°) = 45.0 |
| ih = 14.50 |
| TTL = 35.65 |

TABLE 5-continued

| Surface data | | | | | |
|---|---|---|---|---|---|
| i | r | d | Nd | vd | |
| 1 (pupil plane) | Infinity | 12.0000 | | | |
| 2* | 81.0000 | 0.0680 | 1.492 | 57.44 | |
| 3* | 81.0000 | 3.8758 | 1.544 | 55.93 | (vd1) |
| 4 | Infinity | 0.0000 | | | |
| 5 | Infinity | 0.0720 | 1.492 | 57.44 | |
| 6 (reflective plane) | Infinity | 0.0000 | | | |
| 7 | Infinity | −0.0720 | 1.492 | 57.44 | |
| 8 | Infinity | −3.8758 | 1.544 | 55.93 | |
| 9* | 81.0000 | 0.0000 | | | |
| 10* | 81.0000 | −0.0680 | 1.492 | 57.44 | |
| 11* (reflective plane) | 81.0000 | 0.0000 | | | |
| 12* | 81.0000 | 0.0680 | 1.492 | 57.44 | |
| 13* | 81.0000 | 3.8758 | 1.544 | 55.93 | |
| 14 | Infinity | 0.0000 | | | |
| 15 | Infinity | 0.0720 | 1.492 | 57.44 | |
| 16 | Infinity | 0.5000 | 1.517 | 64.20 | |
| 17 | Infinity | 0.0720 | 1.492 | 57.44 | |
| 18 | Infinity | 3.8758 | 1.544 | 55.93 | (vd2) |
| 19* | −81.0000 | 0.0680 | 1.492 | 57.44 | |
| 20* | −81.0000 | 14.9659 | | | |
| 21 | Infinity | 0.2260 | 1.458 | 67.82 | |
| 22 | Infinity | 0.0000 | | | |
| Display plane | Infinity | | | | |

| Single lens data | | |
|---|---|---|
| Lens | Start surface | Focal length |
| 1 | 3 | 148.815 |
| 2 | 18 | 148.815 |

| Aspherical data | | |
|---|---|---|
| | 3rd surface | 19th surface |
| k | −4.609813E+01 | −4.609813E+01 |
| A4 | 1.083874E−05 | −1.083874E−05 |
| A6 | −4.368245E−08 | 4.368245E−08 |
| A8 | 1.620081E−10 | −1.620081E−10 |
| A10 | −3.802000E−13 | 3.802000E−13 |
| A12 | 4.000000E−16 | −4.000000E−16 |
| A14 | 0.000000E+00 | 0.000000E+00 |
| A16 | 0.000000E+00 | 0.000000E+00 |
| A18 | 0.000000E+00 | 0.000000E+00 |
| A20 | 0.000000E+00 | 0.000000E+00 |

The optical system of Example 5 satisfies conditional expressions (1) to (21) as shown in Table 6.

Figure 15A:
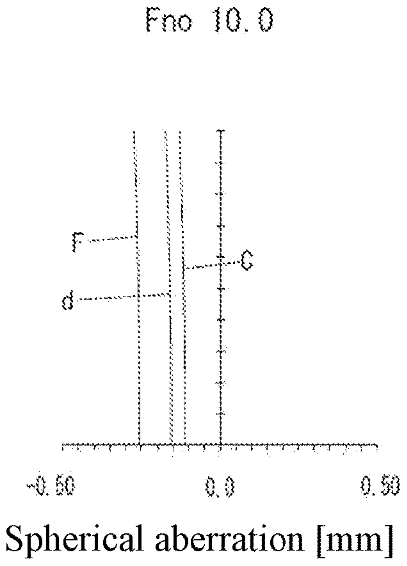
FIG. 15A to FIG. 15C are aberration diagrams showing spherical aberration, astigmatism, and distortion aberration of the optical system shown in FIG. 13.
Figure 15B:
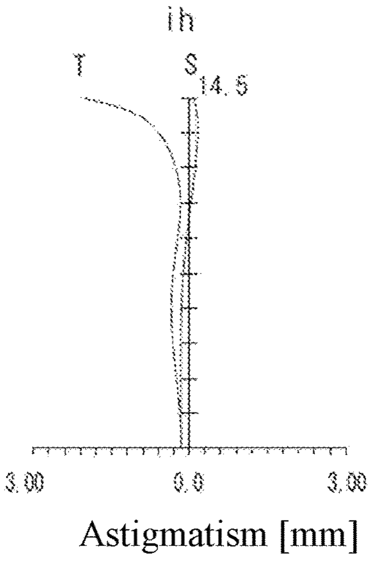
Figure 15C:
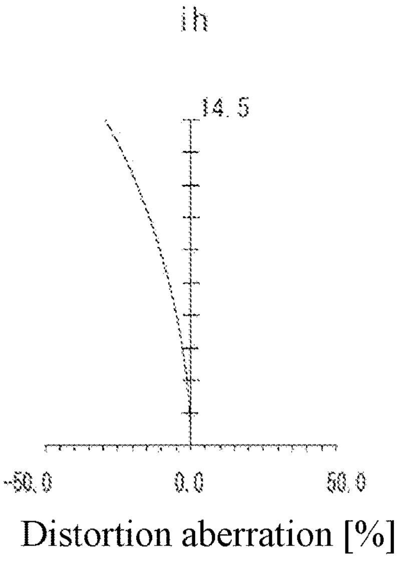

FIG. 15A to FIG. 15C show spherical aberration (mm), astigmatism (mm), and distortion aberration (%) for the optical system of Example 5. As shown in FIG. 15A to FIG. 15C, each aberration is properly corrected.

Table 6 shows the values of conditional expressions (1) to (21) in the optical systems of Example 1 to Example 5.

TABLE 6

| Conditional expression | Example 1 | Example 2 | Example 3 | Example 4 | Example 5 |
|---|---|---|---|---|---|
| (1) r1/T1 | 28.43 | 31.51 | 30.15 | 69.25 | 125.78 |
| (2) (D2/f2) × 100 | 2.24 | 2.24 | 2.24 | 1.99 | 2.60 |
| (3) f2/hm2 | 117.12 | 135.66 | 127.23 | 389.24 | 2066.88 |
| (4) f2/f | 6.35 | 6.36 | 6.36 | 7.26 | 7.20 |
| (5) (f1 + f2)/f | 12.71 | 12.73 | 12.73 | 14.52 | 14.40 |
| (6) r1/f1 | 0.68 | 0.68 | 0.68 | 0.54 | 0.54 |
| (7) r1/(f1 + f2) | 0.34 | 0.34 | 0.34 | 0.27 | 0.27 |
| (8) r4/f2 | −0.68 | −0.68 | −0.68 | −0.54 | −0.54 |
| (9) r4/f2×D2 | −2.24 | −2.24 | −2.24 | −1.99 | −2.11 |
| (10) vd2 | 55.93 | 55.93 | 55.93 | 55.93 | 55.93 |
| (11) (D1/f1) × 100 | 2.24 | 2.24 | 2.24 | 1.99 | 2.60 |
| (12) f1/f | 6.35 | 6.36 | 6.36 | 7.26 | 7.20 |

TABLE 6-continued

| Conditional expression | Example 1 | Example 2 | Example 3 | Example 4 | Example 5 |
|---|---|---|---|---|---|
| (13) f1/f2 | 1.00 | 1.00 | 1.00 | 1.00 | 1.00 |
| (14) r1/r4 | −1.00 | −1.00 | −1.00 | −1.00 | −1.00 |
| (15) r1/f | 4.31 | 4.32 | 4.32 | 3.95 | 3.92 |
| (16) r1/(D1 + T1) | 14.68 | 15.46 | 15.12 | 19.63 | 17.92 |
| (17) r4/f | −4.31 | −4.32 | −4.32 | −3.95 | −3.92 |
| (18) r4/D2 | −30.34 | −30.34 | −30.34 | −27.40 | −20.90 |
| (19) r4/(D1 + D2) | −15.17 | −15.17 | −15.17 | −13.70 | −10.45 |
| (20) r4/(f1 + f2) | −0.34 | −0.34 | −0.34 | −0.27 | −0.27 |
| (21) (r1/r4)/(f1/f2) | −1.00 | −1.00 | −1.00 | −1.00 | −1.00 |

INDUSTRIAL APPLICABILITY

In the case where the optical system according to the disclosure is applied to an image display device, it is possible to contribute to miniaturization of the image display device and improvement of light intensity efficiency, and to improve performance.

What is claimed is:

1. An optical system, comprising, in order from a pupil plane side to a display plane side:

a first reflective polarizing plate;

a first lens having positive refractive power;

a half mirror;

a second lens having positive refractive power;

a second reflective polarizing plate;

a first ¼ wavelength plate arranged between a pupil plane and the half mirror; and a second ¼ wavelength plate arranged between the half mirror and a display plane, wherein the first lens has a convex surface on the pupil plane side at a paraxial position, the second lens has a convex surface on the display plane side at the paraxial position, and the optical system satisfies following conditional expressions (1) and (2):

$$14 < r1/T1 < 250 \quad (1)$$

$$0.7 < (D2/f2) \times 100 < 5.0 \quad (2)$$

where r1: paraxial radius of curvature of a surface of the first lens on the pupil plane side, T1: distance on an optical axis from a surface of the first lens on the display plane side to a surface of the second lens on the pupil plane side, D2: thickness of the second lens on the optical axis, and f2: focal length of the second lens, wherein the optical system satisfies following conditional expression (3):

(3) 55<f2/hm2<3100 where f2: focal length of the second lens, and hm2: distance on the optical axis from a surface of the half mirror on the display plane side to the surface of the second lens on the pupil plane side.

2. The optical system according to claim 1, wherein the optical system satisfies following conditional expression (4):

$$3 < f2/f < 11 \quad (4)$$

where f2: focal length of the second lens, and f: focal length of an entire system of the optical system.

3. The optical system according to claim 1, wherein the optical system satisfies following conditional expression (5):

$$10 < (f1 + f2)/f < 22 \tag{5}$$

where f1: focal length of the first lens, f2: focal length of the second lens, and f: focal length of an entire system of the optical system.

4. The optical system according to claim 1, wherein the optical system satisfies following conditional expression (6):

$$0.25 < r1/f1 < 1.00 \tag{6}$$

where r1: paraxial radius of curvature of the surface of the first lens on the pupil plane side, and f1: focal length of the first lens.

5. The optical system according to claim 1, wherein the optical system satisfies following conditional expression (7):

$$0.1 < r1/(f1 + f2) < 0.5 \tag{7}$$

where r1: paraxial radius of curvature of the surface of the first lens on the pupil plane side, f1: focal length of the first lens, and f2: focal length of the second lens.

6. The optical system according to claim 1, wherein the optical system satisfies following conditional expression (8):

$$-1.00 < r4/f2 < -0.25 \tag{8}$$

where r4: paraxial radius of curvature of a surface of the second lens on the display plane side, and f2: focal length of the second lens.

* * * * *